Figure 7:
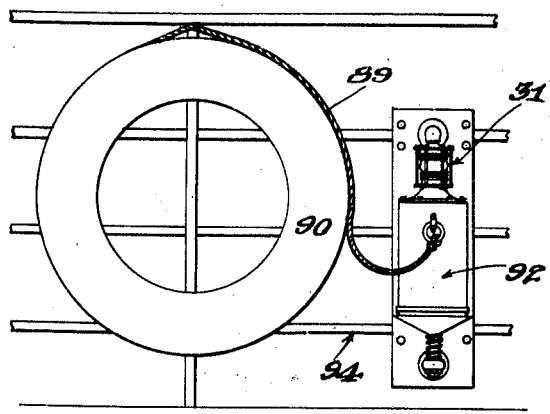

Jan. 11, 1938.  W. B. RINER  2,104,762
SAFETY WATER LIGHT
Filed June 2, 1936  3 Sheets-Sheet 1
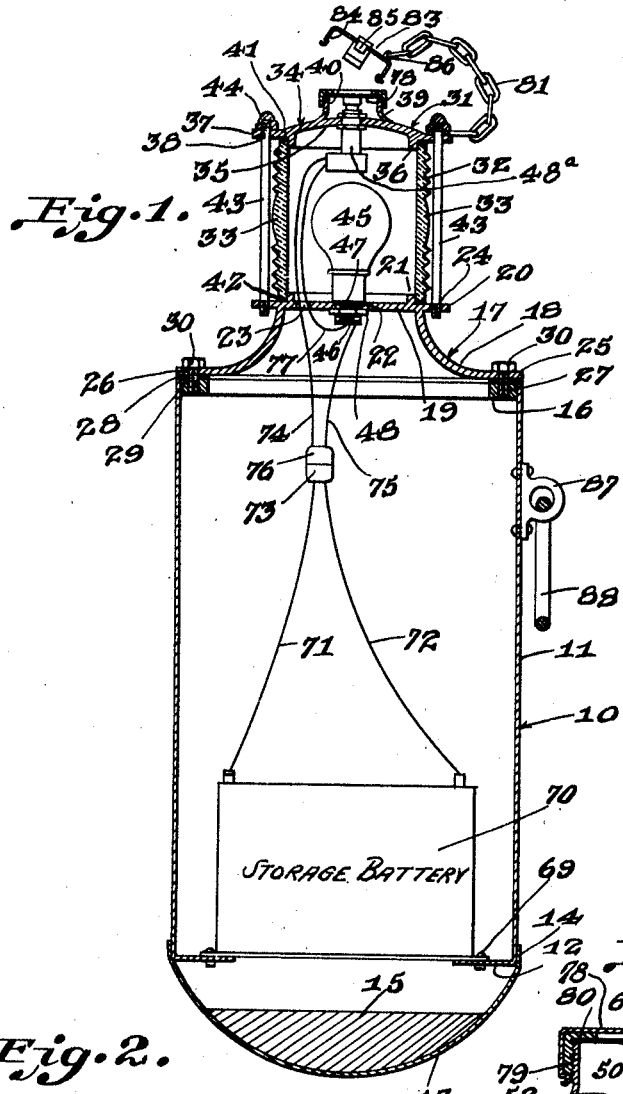
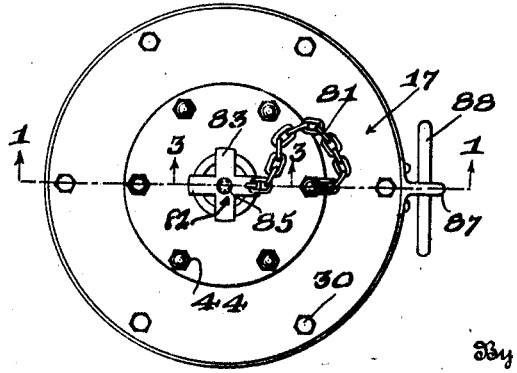
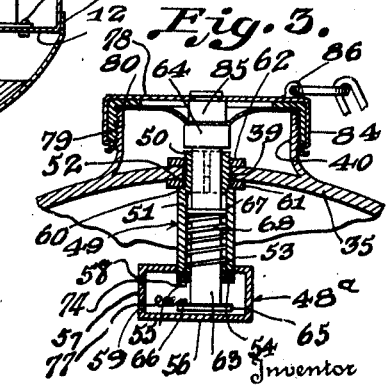
Inventor
William B. Riner
By Kimmel & Crowell
Attorneys

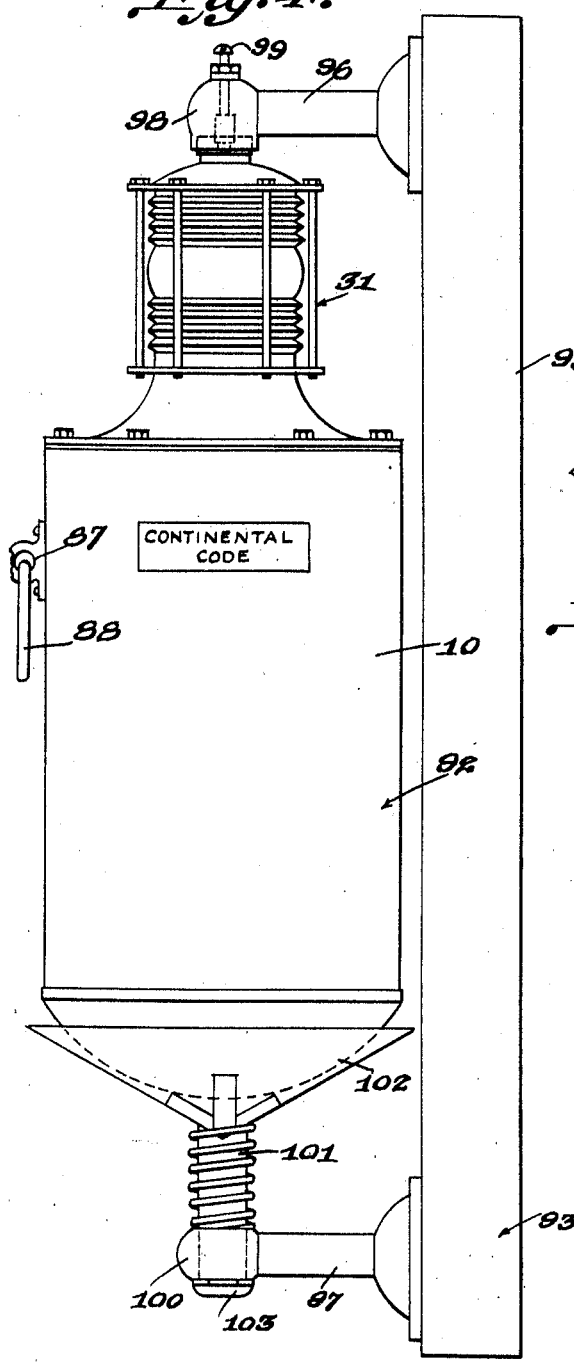
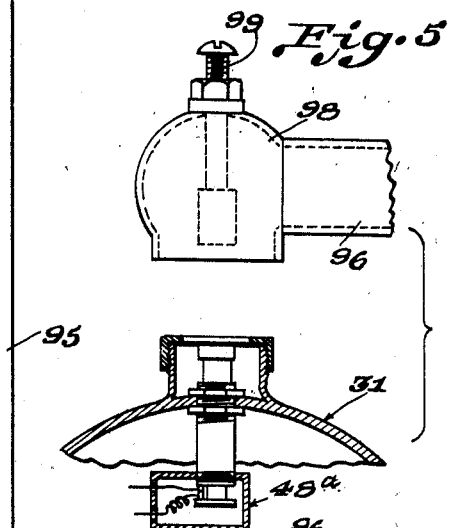
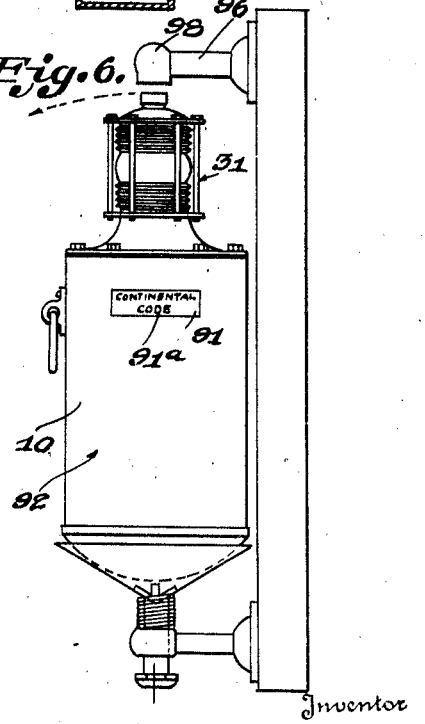

Jan. 11, 1938.   W. B. RINER   2,104,762
SAFETY WATER LIGHT
Filed June 2, 1936   3 Sheets-Sheet 3

Inventor
William B. Riner
By Kimmel & Crowell
Attorneys

Patented Jan. 11, 1938

2,104,762

UNITED STATES PATENT OFFICE 2,104,762

SAFETY WATER LIGHT

William B. Riner, Cincinnati, Ohio

Application June 2, 1936, Serial No. 83,113

4 Claims. (Cl. 177—329)

This invention relates to a safety water light designed primarily for use in the saving of lives, but it is to be understood that it is to be used for any purpose or in any connection for which it may be found applicable.

A safety water light, in accordance with this invention may be attached to a ring buoy or a life raft and may form a part of the life saving equipment of marine and submarine vessels, as well as airplanes which travel over any considerable expanse of water.

One of the objects of the invention is to provide, in a manner as hereinafter set forth, a light of the class referred to having a low center of gravity for the purpose of riding well, both in a current and in waves.

A further object of the invention is to provide, in a manner as hereinafter set forth, a light of the class referred to built to float itself and not to buoy up any other object.

A further object of the invention is to provide, in a manner as hereinafter set forth, a light of the class referred to having means for attaching thereto a ring buoy or life raft and of a construction capable of being thrown or dropped into the water with the ring buoy or life raft attached.

A further object of the invention is to provide, in a manner as hereinafter set forth, a safety water light including an electric light, and a source of current for the latter and means for opening and closing the lighting circuit for the lamp to provide for signalling when the light is in use.

A further object of the invention is to provide, in a manner as hereinafter set forth, a safety water light including an electric lamp in circuit with an electric source and latchable means for maintaining the lighting circuit for the lamp open when the light is not in use.

A further object of the invention is to provide, in a manner as hereinafter set forth, a safety water light including an electric lamp, circuit connections leading from the lamp to an electrical source, a buoyant supporting means for the lamp, circuit connections and source, said means so constructed to provide for convenient access to said lamp, circuit connections and said source.

A further object of the invention is to provide, in a manner as hereinafter set forth, a safety water light including a lens designed to concentrate a beam of light from a small electric lamp which is used to conserve electrical energy and last over a considerable period of time.

A further object of the invention is to provide, in a manner as hereinafter set forth, a safety water light including a small electrical lamp, a source of electrical current for the lamp and an off and on switch for opening and closing the lamp to said source.

A further object of the invention is to provide, in a manner as hereinafter set forth, a safety water light including an electrical lamp, a source of electrical current for the lamp, an off and on switch, means for detachably supporting the light when it is not in use and with said means including parts operating on the off and on switch for maintaining the lighting circuit for the lamp open while the light is detachably connected to said means.

Further objects of the invention are to provide, in a manner as hereinafter set forth, a safety water light which is simple in its construction and arrangement, strong, durable, compact, of a weight to permit its being conveniently handled when desired, readily repaired when occasion requires, thoroughly efficient in its use and comparatively inexpensive to manufacture.

With the foregoing and other objects in view, the invention consists of such parts and such combination of parts as will be more specifically described and as are illustrated in the accompanying drawings wherein are shown embodiments of the invention, but it is to be understood that changes, variations and modifications may be resorted to which fall within the scope of the invention as claimed.

Figure 8:
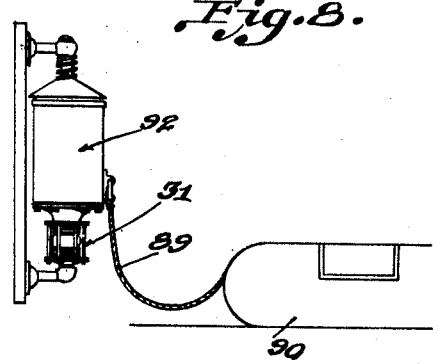
Figure 9:
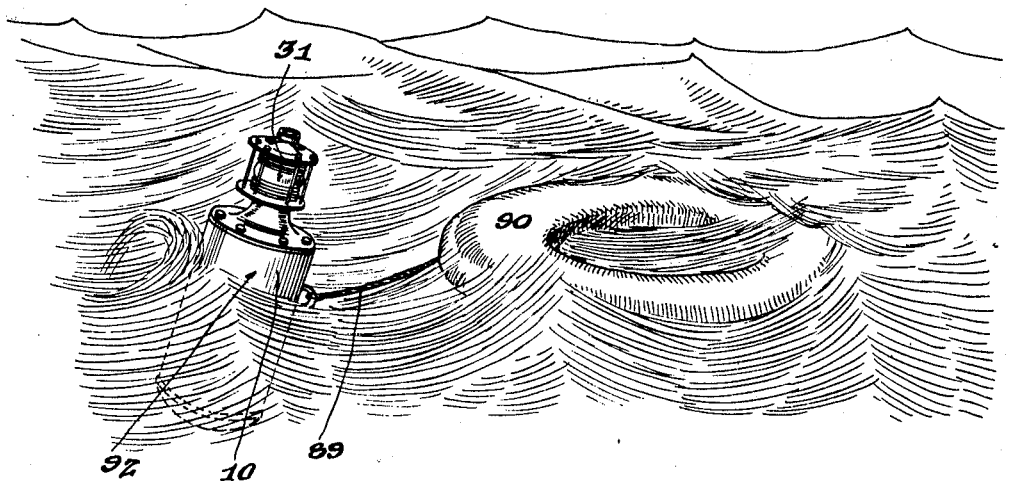

In the drawings:

Figure 1 is a vertical sectional view of the safety water light taken on line 1—1, Figure 2 with the latching means for the off and on switch in non-latching position, Figure 2 is a top plan view of the safety water light with the latching means for the off and on switch in latching position, Figure 3 is a section on line 3—3, Figure 2, Figure 4 is a side elevation of a modified form of safety water light detachably connected to a support therefor and with the lighting circuit maintained open by elements of the support, Figure 5 is a fragmentary disassembled view illustrating the upper end of the light support in side elevation and the upper portion of the modified form of light in vertical section, Figure 6 is a side elevation of the modified form of light and support therefor, with the light in position to be removed from the support and the lighting circuit closed, Figure 7 is a front elevation of the modified form of light detachably connected to a support secured to a deck railing and having coupled thereto a ring buoy, Figure 8 is a side elevation of the structure shown in Figure 7 but with the light and support inverted, and Figure 9 is a perspective view of the modified form of light riding in the water and having coupled thereto a ring buoy.

With reference to Figures 1, 2 and 3, the safety water light includes a housing 10 formed of an annular body part 11 having an inwardly extending annular flange 12 at its lower end, a bottom part 13 of segmental cross section having a vertically disposed annular flange 14 at its upper end and provided therein with a weighting means 15, an annulus 16 anchored to the upper end portion of the inner face of and flush with the top edge of body part 11 and a head part 17. The latter includes an upstanding hollow frusto-tapered portion 18 open at its bottom, seated on the annulus 16 and merging at its upper end into a disc-like closure 19 inwardly adjacent the outer edge of the latter whereby there is provided a flat annular flange 20 extending outwardly at right angles relative to the upper end of portion 18. The upper face of closure 19 is formed with a vertically disposed annular flange 21 arranged in inwardly adjacent relation with respect to the upper end of portion 18. The closure 19 is also formed axially thereof with an opening 22, as well as another opening 23 between flange 21 and opening 22. The closure 19 provides a closed upper end for the housing 10 and also the bottom of an electric lamp casing to be referred to. That part of closure 19 which provides the flange 20 is formed, in proximity to the outer edge of the latter, with a series of spaced threaded openings 24 for a purpose to be referred to. That part of the tapered portion 18, which seats on the annulus 16, is indicated at 25 and formed with spaced openings 26. The annulus 16 has spaced threaded openings 27. Interposed between the part 25 and annulus 26 is a sealing gasket 28 having openings 29 which register with the openings 26, 27. Extending through the registering openings 26, 27, 29 and threadedly engaging with the walls of the openings 27 are holdfast devices 30 for anchoring head part 17 and body part 11 together. The flange 14 on the bottom part 13 encompasses the lower portion of and is suitably anchored to the outer periphery of the body part 11. The housing 10 is buoyant and the weighting means 15 provides for a low center of gravity for the light whereby housing 10 will ride well both in a current and in waves.

The light includes an electric lamp casing generally indicated at 31 and such casing has as parts thereof the closure 19 and the flanges 20, 21, as well as a vertically disposed Fresnel lens 32, that is, a tubular lens of the biprismatic type. The lens 32 has a portion intermediate its ends so formed, as indicated at 33 to throw a narrow and concentrated beam of light on a plane parallel with the water. The lens 32 constitutes the body of the lamp casing 31. The latter also includes a top 34 formed of a part 35 of arcuate contour in cross section, a depending vertically disposed annular flange 36 on the lower face of part 35, and an outwardly directed flat annular flange 37 integral with the part 35 and disposed at right angles with relation to and arranged outwardly of the flange 36. The flanges 21, 36 are aligned. The flanges 20, 37 are aligned. The flange 37 adjacent its outer edge is formed with spaced openings 38. The part 35 has an axial opening 39. The part 35 has its upper face formed with an integral vertically disposed externally threaded sleeve 40 which surrounds and is spaced from opening 39. The lens 32 has arranged against its top and bottom edges the sealing gaskets 41, 42 respectively. The former bears against the lower face of flange 37 and surrounds flange 37. The gasket 42 seats on the upper face of closure 19 and surrounds flange 21. The inner periphery of lens 32 bears against the outer faces of the flanges 21, 36. The closure 19, lens 32 and top 34 are clamped together by a series of tie bolts 43 extending through openings 38 and having threaded engagement with the openings 24. The bolts 43 extend above the flange 37 and depend below the flange 20. Cap nuts 44 threadedly engage with the upper ends of the bolts 43. The lower ends of the bolts may be provided with, if desired, securing nuts.

Mounted in the casing 31 is a vertically disposed electric lamp 45 formed with a depending reduced externally threaded tubular shank 46 which extends through the opening 22. The shank 46 forms the lamp 45 with a shoulder 47 which seats against the upper face of closure 19. Mounted on the shank 46 is a nut 48 which coacts with the shoulder 47 and closure 19 for detachably clamping the lamp in an upstanding position to the closure 19 and with the upper portion of the bulb of the lamp aligning with the focal point of the lens.

The light includes an off and on switching structure 48ª for the lamp, that is to say, a switch for selectively opening and closing the lighting circuit for the lamp. The structure 48ª includes a vertically disposed sleeve 49 formed of an upper and a lower stretch 50, 51 respectively. The stretch 50 has its outer and inner diameters less than the inner and outer diameters of the stretch 51. The junction of the stretches 50, 51 provides sleeve 49 with an internal shoulder 52 constituting an abutment. The stretch 50 is peripherally threaded. The stretch 51 at its lower end is provided with an inwardly extending flange 53 constituting an abutment aligning with the abutment provided by the shoulder 52. The stretch 51 is of greater length than stretch 50 and has secured to its lower edge a contact 54 provided with a contact post or lug 55. The lower end of stretch 51 is anchored in the top wall of a horizontally disposed closed rectangular receptacle 56 having one of its ends, as indicated at 57, formed with a pair of superposed openings 58, 59. The junction of the stretches 50, 51 form the sleeve 49 with an external shoulder 60 upon which is seated a clamping nut 61 having threaded engagement with the stretch 50. The latter extends upwardly through 39 and has threadedly engaged therewith a nut 62. The nuts 61, 62 coact with the part 35 of top 34 and stretch 50 for suspending the switching structure 48ª within the lamp casing 31 above the lamp 45. Operating in the sleeve 49 is a depressible spring controlled circuit opening and closing member 63 normally functioning to close the lighting circuit for lamp 45. The member 63 is in the form of a plunger extending through and of greater length than the sleeve 49. The member 63 is provided at its upper end with a head 64 of a diameter to prevent the latter from entering stretch 50. Carried by the lower end of member 63 is a contact 65 provided with a contact post or lug 66. Arranged within the stretch 51, surrounding the member 63 and interposed between an abutment 67 on the latter and the flange 53, is the controlling spring 68 for member 63. The spring 68 normally tends to hold the contact posts 54, 66 engaged to close the lighting circuit for the lamp 45. In Figure 3 the member 63 is shown in a depressed position whereby the lighting circuit is open.

Mounted upon and secured to the flange 12, as at 69, is an electrical storage battery 70 with which is attached the circuit connections for the lamp 45. The connections include a pair of conductors 71, 72 leading from the battery 70 to a socket 73, a pair of conductors 74, 75 leading from a plug 76 and a conductor 77. The plug 76 is adapted to engage in the socket 73 for electrically connecting the conductors 71, 72 to the conductors 74, 75 respectively. The conductor 74 extends through the opening 57 in receptacle or box 56 and is connected to contact 54 by binding post 55. The conductor 75 is electrically connected to lamp 45. The conductor 77 leads from lamp 45, extends through opening 23 in closure 19, extends into receptacle or box 56 through opening 58 and is connected to contact 65 by the binding post 66.

Mounted on the top edge of sleeve 40 is a depressing member 78 for the member 63. Preferably, member 78 will be formed of raw hide and is of disc-like form. The member 78 is secured upon the top edge of the sleeve 40 by an internally threaded collar 79 formed at its top with an inwardly extending annular flange 80 bearing against the marginal portion of the upper face of member 78.

Attached to the lamp casing 31 by a chain 81 is combined latching device 82 for releasably maintaining the member 63 in a depressed position to open the lighting circuit. The device 82 consists of a cruciform-shaped member 83 having each of its arms or legs formed with a depending inwardly flanged spring clip 84 for engagement against the bottom edge of collar 79. The device 82 includes a retainer 85 which is secured axially of and depends from member 83 to engage and depress member 78 axially, which in turn will depress the circuit opening and closing member 63. The member 83 carries an apertured lug 86 to which one end link of a chain 81 is attached. The other end link of chain 81 is connected to one of the tie bolts 43 by a cap nut 44 on the upper end of such bolt. In Figure 3 of the drawings, the device 82 is shown in latching position. In Figure 1 of the drawings, the device 82 is shown in non-latching position.

Secured to the body part 11 of housing 10 exteriorly thereof is a bracket 87 which pivotally and slidably carries a ring 88 to which a flexible coupling member 89 for a ring buoy 90 may be secured.

The housing of any one of the forms shown has the periphery thereof provided with a plate 91 provided with conventional means as at 91ª to indicate a particular code, by way of example, the "Continental Code" which the imperiled individual should use when signalling through the medium of the lamp and the circuit opening and closing means for the lamp.

The modified construction of light shown at 92 in Figures 4, 5, 6, 7, 8 and 9 is generally indicated at 92 and is similar in construction to that shown in Figures 1, 2 and 3 with this exception that the latching device 82 does not form a part thereof.

When the modified form of light, as indicated at 92 is not in use, it may be detachably connected to a support 93 in the position shown in Figures 4, 6 and 7 or in an inverted position as shown in Figure 8. The support 93 preferably is anchored stationary, and is shown by way of example, anchored to a deck railing 94 Figure 7.

The support 93 includes a vertically disposed base 95 carrying a pair of aligned outwardly extending superposed upper and lower arms 96, 97. The arm 96 has secured to its outer end a hollow head 98 which is open at its bottom. The head 98 carries a vertically disposed, adjustable combined depressing and clamping element 99 axially thereof. The outer end of arm 97 carries an annulus 100 through which extends a spring controlled supporting post 101 having fixed to its upper end a hollow inverted conoidal-shaped seat forming member 102 to receive the bottom of housing 10. The lower end of post 101 is enlarged as at 103 to prevent the post 101, on its upward movement from separating from the annulus. The controlling spring for post 101 is indicated at 103. The spring surrounds post 101 and is interposed between the member 102 and annulus 100. The normal purpose of spring 103 is to maintain the post 101 and member 102 in the position shown in Figure 4 relative to the light 92 whereby the spring 103 will force light 92 upwardly to have element 99 depress member 79, which in turn will act on and depress member 63 opening and maintaining the lamp circuit open until the light 92 is lowered against the action of spring 103, as shown in Figure 6 and then removed from support 93.

With reference to Figure 8, the purpose of the inverted position of the light is that in this arrangement the spring is just sufficiently strong to hold the light and the latter is released with a slight pull. Thus if the ship should sink the raft would float off, pulling the light from this mooring without human attention.

Since the holder structure will preferably be secured to the outside of a boat rail and the light secured to a ring buoy, even when one is unfamiliar with the use of the light or the connection of the light to the ring buoy, the force of the thrown or dropped buoy will be sufficient to remove the light from the holder structure.

What I claim is:—

1. A safety water light comprising a closed buoyant housing having a weighting means therein at the bottom thereof, a source of electrical energy mounted in the housing above the said means, a closed lamp casing positioned upon and anchored to the upper end of the housing, the top of said casing being provided thereon with an exteriorly threaded sleeve, a lamp element arranged within said casing and supported from the top of the housing, a lighting circuit forming means between said lamp and said source, a circuit controlling structure suspended in said casing from the top of the latter, interposed in said circuit for normally maintaining the latter closed and including a spring controlled circuit opening and closing member extending through the top of the casing into said sleeve, depressible means secured to said sleeve and operated from the exterior of the casing for shifting said member to open said circuit, and means for latching said depressible means in depressed position.

2. A safety water light comprising a closed buoyant housing having a weighting means therein at the bottom thereof, a source of electrical energy mounted in the housing above the said means, a closed lamp casing positioned upon and anchored to the upper end of the housing, the top of said casing being provided thereon with an exteriorly threaded sleeve, a lamp element arranged within said casing and supported from the top of the housing, a lighting circuit forming means between said lamp and said source, a circuit controlling structure suspended in said casing from the top of the latter, interposed in said circuit for normally maintaining the latter closed and including a spring controlled circuit opening and closing member extending through the top of the casing into said sleeve, depressible means secured to said sleeve and operated from the exterior of the casing for shifting said member to open said circuit, and means for latching said depressible means in depressed position, the said latching means being carried by said casing.

3. A safety water light comprising a closed buoyant weighted housing, a source of electrical energy within the housing, electrical illuminable means above and supported from the housing, means supported from the top of the housing encompassing and coacting with said illuminable means, when the latter is active, to provide a concentric beam of light on a plane parallel with the water, an illuminating circuit leading from said source to said illuminable means, and means suspended from and within said encompassing means and interposed in said circuit for normally maintaining the circuit closed, and a shiftable part extended into and operated from the exterior of said encompassing means for opening said circuit.

4. A safety water light comprising a closed buoyant weighted housing, a source of electrical energy within the housing, electrical illuminable means above and supported from the housing, means supported from the top of the housing encompassing and coacting with said illuminable means, when the latter is active, to provide a concentric beam of light on a plane parallel with the water, an illuminating circuit leading from said source to said illuminable means, means suspended from and within said encompassing means and interposed in said circuit for normally maintaining the circuit closed, and a shiftable part extended into and operated from the exterior of said encompassing means for opening said circuit, and means for releasably holding said part in circuit opening position.

WILLIAM B. RINER.